United States Patent [19]

Brydon et al.

[11] Patent Number: 5,486,399
[45] Date of Patent: Jan. 23, 1996

[54] SELF-SUPPORTING CONVEX COVER FOR SPACECRAFT

[75] Inventors: Louis B. Brydon, San Carlos; Samuel R. Moore; Peter W. Lord, both of Palo Alto, all of Calif.

[73] Assignee: Space Systems/Loral, Inc., Palo Alto, Calif.

[21] Appl. No.: 130,158

[22] Filed: Sep. 30, 1993

Related U.S. Application Data

[63] Continuation of Ser. No. 819,285, Jan. 13, 1992, abandoned.

[51] Int. Cl.⁶ .............................. B32B 3/06; B32B 3/12; B32B 3/28; H01Q 15/02
[52] U.S. Cl. ................... 428/99; 343/872; 343/909; 428/159; 428/163; 428/175; 428/193; 428/247; 428/256; 428/316.6
[58] Field of Search .......................... 343/872, 909; 428/245, 246, 286, 284, 287, 294, 99, 159, 163, 175, 193, 247, 256, 316.6

[56] References Cited

U.S. PATENT DOCUMENTS

| | | | |
|---|---|---|---|
| 2,641,561 | 6/1953 | Black | 154/45.9 |
| 2,956,281 | 10/1960 | McMillan | 343/872 |
| 3,039,100 | 6/1962 | Kay | 343/872 |
| 4,358,772 | 11/1982 | Leggett | 343/872 |
| 4,479,131 | 10/1984 | Rogers | 343/872 |
| 4,506,269 | 3/1985 | Greene | 343/872 |
| 4,554,038 | 11/1985 | Allard | 156/196 |
| 4,615,933 | 10/1986 | Traut | 428/252 |
| 4,847,506 | 7/1989 | Archer | 250/515.1 |
| 4,866,457 | 9/1989 | Hogg | 343/872 |
| 4,918,459 | 4/1990 | De Teso | 343/872 |
| 4,956,393 | 9/1990 | Boyd | 521/54 |
| 5,273,815 | 12/1993 | Brydon et al. | 428/266 |

FOREIGN PATENT DOCUMENTS

| | | | |
|---|---|---|---|
| 0489531 | 6/1992 | European Pat. Off. | H01Q 1/00 |
| 59-16401 | 1/1984 | Japan | H01Q 1/42 |

OTHER PUBLICATIONS

Bowman, C. et al., "Ito-Coated RF Transparent Materials For Antenna Sunshields–Space Environment Effects," pp. 2134–2137, IEEE Transactions on Nuclear Science, vol. 37, No. 6, Dec. 1990, New York, U.S., XP000177782.

Powell, Marcia S. et al., "A Thermally Opaque, Millimeter-Wave Radome For Space," pp. 927–930, 1986 International Symposium Digest Antennas and Propagation, vol. II, Jun. 1986, Philadelphia, U.S.

Primary Examiner—James D. Withers
Attorney, Agent, or Firm—Kenneth M. Kaslow; Edward J. Radlo; Phong K. Truong

[57] ABSTRACT

A self-supporting convex cover for spacecraft hardware is described. In the preferred embodiment, the cover is made of a laminated material. Strips of material are inserted into the laminate in a channel shape, such that sufficiently rigid box beam structures are formed in a pattern to hold the convex shape. Ribs of foam may be placed between a layer of the laminate and the strips of material to provide the channel shape. The cover is attached to the spacecraft hardware by one or more drawstrings which are laced through the perimeter of the cover. With appropriate materials, the resulting assembly is light, inexpensive, easy to assemble, and transparent to radio frequencies, yet sturdy enough to maintain its shape during launch.

13 Claims, 2 Drawing Sheets

SELF-SUPPORTING CONVEX COVER FOR SPACECRAFT

This is a continuation of U.S. patent application Ser. No. 07/819,285 filed on Jan. 13, 1992, now abandoned.

BACKGROUND OF THE INVENTION

1. Field of the Invention

The present invention relates to a self-supporting convex cover or radome for use as a protective cover for spacecraft hardware in the space environment, for example, for providing thermal stability and electrostatic charge dissipation. The radome is ideally also of low weight on earth, and can be made transparent to a wide range of radio frequencies if desired.

2. Description of the Related Art

Various types of equipment, such as communications equipment, require protection when placed in environments which are electrically charged and/or contain great thermal variations to avoid damage or distortion of the equipment. For example, the space environment subjects spacecraft exterior hardware, such as antennas, to great extremes in temperature and high fluxes of charged particles, or plasma. Great variations in temperature over short periods of time can cause mechanical distortions in the exterior hardware. Protecting communications hardware from extreme environments, such as space, presents a special problem because the materials and methods of construction normally used to protect spacecraft hardware interfere with radio signal transmissions. Also, the flat covers generally used in the prior art will focus reflected solar energy back on the spacecraft.

Although protection from the hostile environment is a primary concern, minimization of the cost of the cover and its total weight are competing concerns. The cover should also be self-supporting so that it does not collapse on the hardware it is intended to protect. When desired or necessary, it should also minimize interference and attenuation of radio signals due to the cover or its support structure. The radomes used in other environments typically are heavier than necessary in space, and the extra weight makes their use undesirable. Thus, there is a need for a radome that is self-supporting and lightweight, and yet relatively inexpensive, capable of providing electrical and thermal protection, and that can be made transparent to a wide range of radio frequencies.

Various types of radomes for use on earth, in the atmosphere, or in space are shown in the prior art which meet some of these criteria, but none meet all of them. For example, Boyd et al., U.S. Pat. No. 4,956,393, discloses the use of certain types of syntactic foams in radomes for use in the atmosphere. However, while a polycyanate resin could be used in the present invention, Boyd et al. does not disclose any construction other than a dome of constant thickness. Also, syntactic foams in general cause significant radio frequency losses due to their density.

Archer, U.S. Pat. No. 4,847,506, shows the use of tiles like those used on the space shuttle to protect the spacecraft hardware. While this fibrous silica material is somewhat like a foam, the use of such tile to make a radome makes the structure quite heavy. The use of this tile in Archer is not for protecting the hardware from the space environment, but from high energy laser radiation or nuclear radiation from "satellite killers."

Traut, U.S. Pat. No. 4,615,933, shows a process for manufacturing Teflon saturated glass fabric for microwave radomes. However, Traut is directed at aircraft applications and the material is heavier than desired for space applications.

Greene, U.S. Pat. No. 4,506,269, shows the use of a hard thermoplastic polycarbonate sandwich, again intended for use in the atmosphere, such as for use on a plane traveling at supersonic speeds. Thus, it is again far stronger and heavier than is necessary or desirable for space applications. Further, the ratio of core material to air must be adjusted to "tune" the frequency at which the radome is most transparent to microwaves.

Rogers et al., U.S. Pat. No. 4,479,131, shows a sun shield of a material somewhat similar to that used in the preferred embodiment of the present invention. However, to block the sun while achieving radio frequency transparency, Rogers et al. utilizes a capacitive grid of aluminum squares. Also, there is no self-supporting structure or convex shape in Rogers et al., as in the present invention. In fact, Rogers et al. teaches away from the present invention as it recommends the use of non-rigid materials which are not self-supporting.

McMillan et al., U.S. Pat. No. 2,956,281, shows the use of a "cellular" or foam dialectric material in radomes. An outer skin or, alternatively, ribs of a dialectric material may be used to provide structural strength. However, where ribs are used, the cellular material must be loaded with particles having a dialectric constant such that the overall dialectric constant of the radome remains uniform across the surface.

Black, U.S. Pat. No. 2,641,561, shows fiberglass records running through a uniformly thick radome of glass foam between fiberglass sheets. This radome is intended for use in airplanes, and is unacceptably bulky and heavy for space applications.

Japanese patent No. 59-16401 shows the use of foamed plastic balls to fill up an antenna dish to prevent the radome from touching the antenna itself. This is not only too bulky and heavy for space applications, but results in uneven support for the radome.

A radome is thus desired which does not focus sunlight onto the spacecraft and which is self-supporting, thin, light in weight, easy to manufacture, simple to attach and transparent to radio frequencies.

DISCLOSURE OF THE INVENTION

To accomplish these and other objects, the present invention provides a radome constructed of a laminate material having within it foam ribs which form a grid pattern and which support the radome. The convex shape disperses incident sunlight instead of focusing it on the spacecraft. The cover is attached with a drawstring which prevents temperature variations from distorting the cover while holding it securely. The cover is light and simple to attach and can be made transparent to radio frequencies, while providing thermal and electrostatic protection.

DETAILED DESCRIPTION OF THE PREFERRED EMBODIMENT

Figure 1:
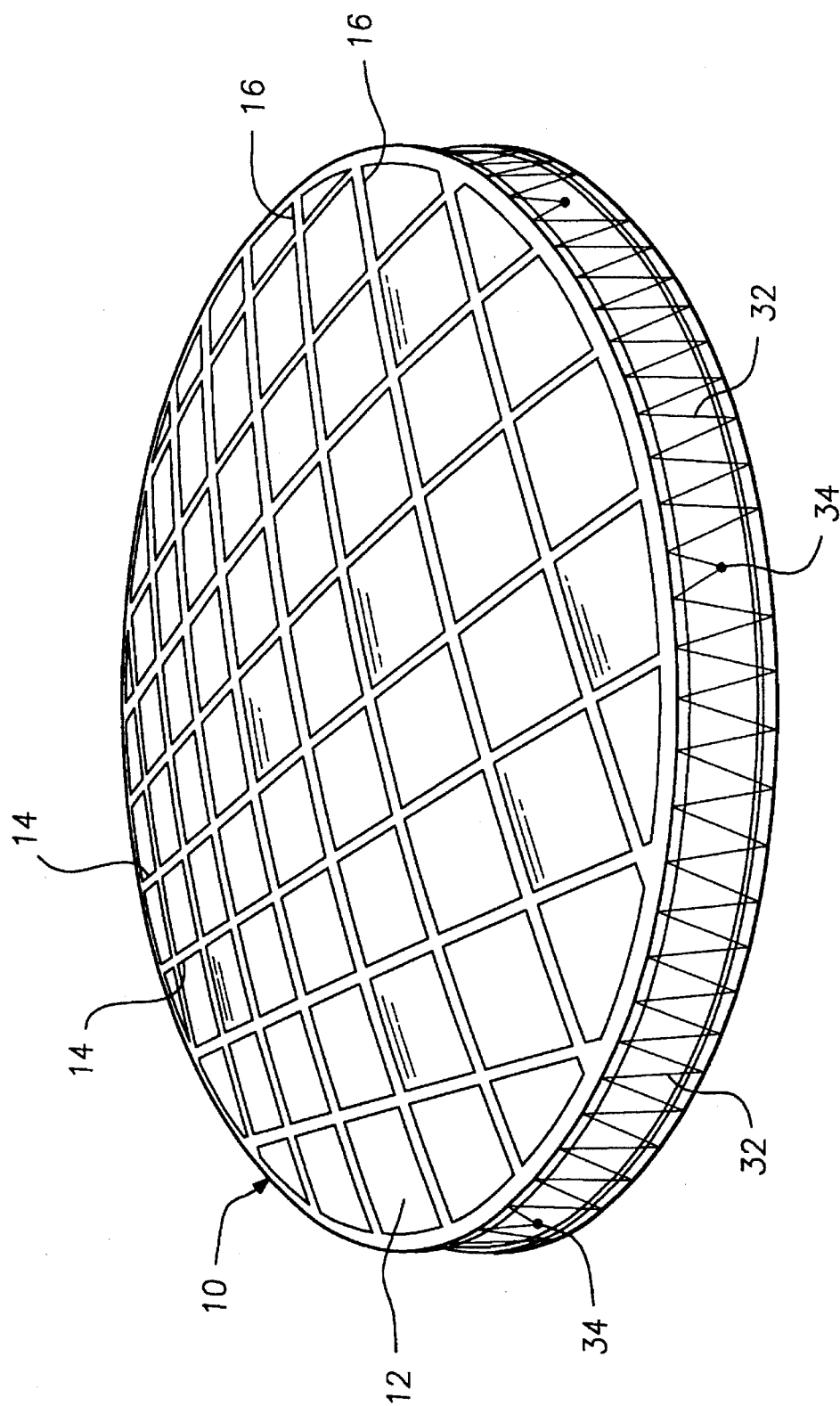
FIG. 1 is a perspective view of a radome constructed according to the present invention, showing a rectangular grid pattern of support ribs on the radome.
Figure 2:
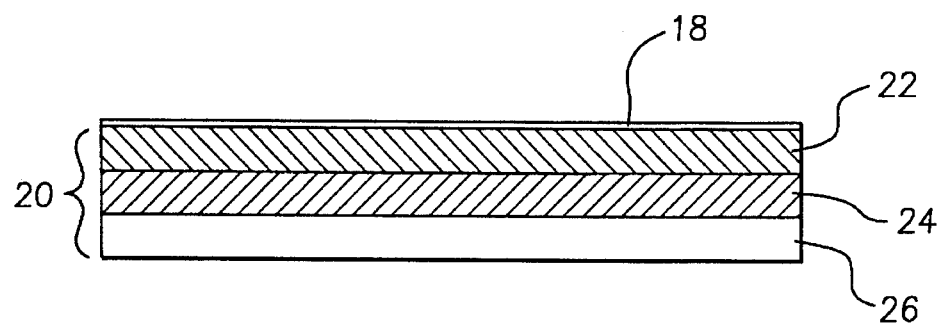
FIG. 2 is a cross-sectional view of the radome of FIG. 1 at a section between the ribs.
Figure 3:
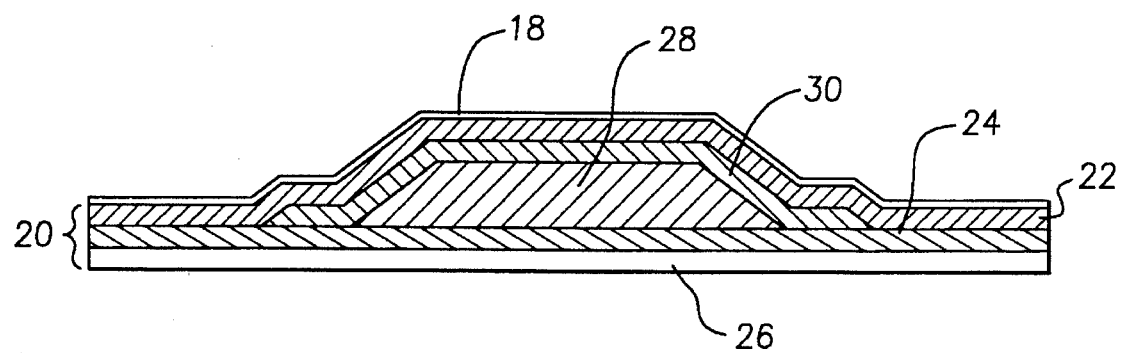
FIG. 3 is a cross-sectional view of the radome of FIG. 1 at a section including one of the ribs.

Referring now to FIGS. 1 to 3, the preferred embodiment of a radome 10 of the present invention comprises a convex dome 12 having a first plurality of parallel ribs 14 running across the surface of the dome 12 in one direction at spaced intervals, and a second plurality of parallel ribs 16 running across the surface of the dome 12 in a direction perpendicular to that of the first set of ribs 14, also at spaced intervals, such that the two sets of ribs form a rectangular grid.

In the preferred embodiment, dome 12 is made of a material such as that described in U.S. Pat. No. 5,273,815 entitled "Thermal Control and Electrostatic Discharge Laminate," filed Aug.27, 1991 and owned by the same assignee as the present invention. This material is shown in FIG. 2. It comprises a conducting layer 18 and a thermal control layer 20. The conducting layer 18 is preferably a semiconductor, such a germanium. The thermal control layer 20 comprises a film layer 22 abutting the conducting layer 18, a mesh layer 24 attached to the film layer 22, and a thermally reflective coating 26. In the preferred embodiment, the film layer is a polyamide film such as that marketed by Du Pont under the trademark Kapton®. The mesh layer 24 is an epoxyimpregnated woven polyamide fabric such as Nomex® or Kevlar®, and thermally reflective coating 26 is a polyvinylflouride (PVF) film, such as Tedlar®, all also marketed by Du Pont.

As described in the prior application, this laminate makes an ideal cover for spacecraft hardware, as it allows electrostatic charges that accumulate to be grounded, reflects most of the thermal energy directed at the spacecraft from external sources, and evens the temperature gradients across the hardware and reduces the rate of change in temperature by reflecting internal radiation back onto the antenna, thus avoiding physical distortions of the hardware.

While it is possible to deploy a radome of this material by stretching it tightly across the open side of an antenna dish, this can place undesirable stress on the dish and also again results in a flat cover which can reflect solar energy onto the spacecraft. It is thus preferable to use a radome of a convex shape, i.e. that bulges outward from the dish. However, the laminate material alone does not have enough structural strength to make it self-supporting, and such a radome would collapse during the spacecraft launch. In order to have such a convex radome, some structure must thus be provided to hold the radome in the desired position.

In order to accomplish this, a foam rib 28 is added, as seen in FIG. 3. As a practical matter, this is done by placing the foam rib 28 on the outer surface of the mesh layer 24 shown in FIG. 2 and placing strips of mesh 30 over the foam rib 28. The mesh 30 is then attached to the mesh layer 24, and forms a box beam stiffener due to the spacing provided by the foam rib 28.

In the preferred embodiment, two sets of foam ribs 28 are located in a rectangular grid at spaced intervals, as shown in FIG. 1, so as to provide the maximum support for minimum weight and bulk. The foam ribs 28 can be cut and mitred at the intersections to keep the cover as thin as possible. (The strips of mesh 30 are thin enough that it is not necessary to mitrethem also.) The box beams stiffeners formed need only be stiff enough to keep the radome from collapsing on earth and during launch, and thus may be quite light. The preferred foam material is a high temperature thermoplastic foam marketed under the name Rohacell.®

The cover is attached to the antenna dish with one or more drawstrings 32 which are laced through the cover at evenly spaced intervals and attached to a number of anchor points 34 on the dish (FIG. 1). By using a number of anchor points and several drawstrings, each attached to a portion of the cover, there is a minimum of force on each string. Also, if one string breaks the others will hold the cover in place. The strings will also stretch slightly to allow some flexibility in the cover, thus compensating for temperature variations.

When made of the materials described above, the cover is relatively easy to assemble. The Kevlar mesh contains enough epoxy to hold the components together. The layers are placed on top of one another as described above and then pressure loaded down onto a tool, and the epoxy allowed to cure either at room temperature or under heat for faster curing.

In the preferred embodiment, with the laminate made of the materials indicated above, the laminate itself is about 0.01" thick. The foam inserts may be as thin as 0.2". It is thus apparent that the radome may be quite light and compact, and that this construction is advantageous over the prior art. Further, since the laminate and the foam are both essentially transparent to radio frequencies, there is no need to consider which frequencies are most suitable for use in the antenna, or to try to "tune" the radome to a particular frequency. In some applications different materials may be used which provide other benefits. For example, aluminum can be used on the outer surface to increase the amount of solar energy reflected by the cover. However, this reduces the radio frequency transparency of the cover.

What is claimed is:

1. A self-supporting convex cover for spacecraft hardware, comprising:

a sheet of laminated material comprising a conductive layer and a thermal control layer, said thermal control layer comprising a film layer, a mesh layer, and a thermally reflective coating;

a first plurality of foam rib stiffener elements attached to the material for holding the material in a convex shape; and means for attaching the material to the spacecraft hardware;

wherein the hardware has a plurality of anchor points and the cover has a perimeter, and the means for attaching the sheet of material to the spacecraft hardware comprises a drawstring attached to the perimeter of the cover and to the plurality of anchor points.

2. A self-supporting convex cover for spacecraft hardware according to claim 1, wherein the drawstring is attached to the cover by being laced through the perimeter of the cover.

3. A self-supporting convex cover for spacecraft hardware, comprising:

a sheet of laminated material comprising a conductive layer and a thermal control layer, said thermal control layer comprising a film layer, a mesh layer, and a thermally reflective coating;

a first plurality of foam rib stiffener elements attached to the material for holding the material in a convex shape; and means for attaching the material to the spacecraft hardware;

wherein the hardware has a plurality of anchor points and the cover has a perimeter, and the means for attaching the sheet of material to the spacecraft hardware comprises a plurality of drawstrings, each of which is attached to a portion of the perimeter of the cover and to one or more of the plurality of anchor points.

4. A self-supporting convex cover for spacecraft hardware according to claim 3, wherein each drawstring is attached to a portion of the perimeter of the cover by being laced through the portion of the perimeter of the cover.

5. A self-supporting convex cover for spacecraft hardware, comprising:

a sheet of laminated material comprising a conductive layer and a thermal control layer, said thermal control layer comprising a film layer, a mesh layer, and a thermally reflective coating;

a first plurality of stiffener elements attached to the material for holding the material in a convex shape; and a connector for attaching the material to the spacecraft hardware;

wherein the stiffener elements further comprise strips of a material having a channel shape placed between the conductive layer and the thermal control layer and attached to the thermal control layer to form box beam structures in the laminated material;

wherein the stiffener elements further comprise foam ribs inserted between the channel shaped strips and the thermal control layer to which the channel shaped strips are attached to define the box beam shape of the stiffeners.

6. A self-supporting convex cover for spacecraft hardware according to claim 5, wherein the strips of channel shaped material are attached to the mesh layer, and wherein both the strips of channel shaped material and the mesh layer are constructed of a polyamide mesh impregnated with epoxy and are cured after being attached.

7. A self-supporting convex cover for spacecraft hardware according to claim 5, wherein the strips of channel shaped material are attached to the mesh layer, and wherein both the strips of channel shaped material and the mesh layer are constructed of a rigid polyamide fabric.

8. A self-supporting convex cover for spacecraft hardware, comprising:

a sheet of laminated material comprising a conductive layer and a thermal control layer, said thermal control layer comprising a film layer, a mesh layer, and a thermally reflective coating;

a first plurality of stiffener elements attached to the material for holding the material in a convex shape; and a connector for attaching the material to the spacecraft hardware;

wherein the stiffener elements are essentially parallel to each other, and further comprising a second plurality of stiffener elements which are essentially parallel to each other but are at an angle to the first plurality of stiffener elements;

wherein the stiffener elements further comprise strips of a material having a channel shape placed between the conductive layer and the thermal control layer and attached to the thermal control layer to form box beam structures in the laminated material;

wherein the stiffener elements further comprise foam ribs inserted between the channel shaped strips and the thermal control layer to which the channel shaped strips are attached to define the box beam shape of the stiffeners.

9. A self-supporting convex cover for spacecraft hardware according to claim 8, wherein the strips of channel shaped material are attached to the mesh layer, and wherein both the strips of channel shaped material and the mesh layer are constructed of a polyamide mesh impregnated with epoxy and are cured after being attached.

10. A self-supporting convex cover for spacecraft hardware according to claim 8, wherein the strips of channel shaped material are attached to the mesh layer, and wherein both the strips of channel shaped material and the mesh layer are constructed of a rigid polyamide fabric.

11. A self-supporting convex cover for spacecraft hardware, comprising:

a laminated material having a conductive layer and a thermal control layer, said thermal control layer comprising a film layer, a mesh layer, and a thermally reflective coating, said material covering a portion of the hardware;

a plurality of strips of material having a channel shape attached to the thermal control layer to form box beam structures in the laminated material;

a plurality of drawstrings, each of which is laced through a portion of the perimeter of the cover and attached to the hardware at one or more anchor points; and foam ribs inserted between the channel shaded strips and the thermal control layer.

12. A self-supporting convex cover for spacecraft hardware according to claim 11, wherein the strips of channel shaped material are attached to the mesh layer, and wherein both the strips of channel shaped material and the mesh layer are constructed of a polyamide mesh impregnated with epoxy and are cured after being attached.

13. A self-supporting convex cover for spacecraft hardware according to claim 11, wherein the strips of channel shaped material are attached to the mesh layer, and wherein both the strips of channel shaped material and the mesh layer are constructed of a rigid polyamide fabric.

* * * * *